United States Patent
Ong et al.

(10) Patent No.: US 8,065,656 B2
(45) Date of Patent: Nov. 22, 2011

(54) AUTO CODE GENERATION TO GENERATE PACKET HEADER GENERATION LIBRARY FOR SWITCH DIAGNOSTICS

(75) Inventors: Stephen Ong, Cupertino, CA (US); Ali Haeri, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 119 days.

(21) Appl. No.: 12/474,907

(22) Filed: May 29, 2009

(65) Prior Publication Data

US 2010/0303098 A1   Dec. 2, 2010

(51) Int. Cl.
*G06F 9/44* (2006.01)
(52) U.S. Cl. ............................. 717/106; 370/474; 703/23
(58) Field of Classification Search .................. 370/464, 370/474; 703/23; 717/100, 106
See application file for complete search history.

(56) References Cited

U.S. PATENT DOCUMENTS

| 2008/0144632 A1* | 6/2008 | Rabie et al. | 370/395.5 |
| 2010/0017188 A1* | 1/2010 | Shaffer et al. | 703/23 |

* cited by examiner

*Primary Examiner* — Hassan Kizou
*Assistant Examiner* — Siming Liu
(74) *Attorney, Agent, or Firm* — Patterson & Sheridan, LLP

(57) ABSTRACT

Techniques are disclosed for describing packet headers in a format that can be used by a code generation tool to generate source code that can generate any type of packet header when compiled and invoked within switch/router firmware. Such packet headers may then be used in a variety of switch diagnostic/testing functions. A code generation tool may be configured to receive a description of a packet header in the description format. The packet description language provides an easily used approach for defining fields in a packet header. Further, the code generation tool may be configured to generate packet header library for use by firmware on a network device, e.g., for testing and diagnostic functions.

20 Claims, 7 Drawing Sheets

```perl
package PktHdrYardl;
our %type;
our %table;
our %module;

my ($reps,$repSize,$currentBit);
sub width {
    my $width = shift;
    $currentBit = shift if (@_);
    my $oldBit = $currentBit;
    $currentBit = $oldBit - $width;
    return [$currentBit+1,$oldBit];
}
sub widthStraight {
    my $width = shift;
    my $oldBit = $currentBit;
    $currentBit = $oldBit + $width;
    return [$oldBit,$currentBit-1];
}

$repSize = 8;
$reps =2;
$currentBit=$repSize*8*$reps-1;

$type{EtherHeader} = {
    addPerlCopyConstructor => 1,
    include => 'pkthdr/EtherHeader.h',
    field => [
        {   type => 'EtherAddr' ,
            name => 'dst',
            bitRange => width(48),
        },
        {   type => 'EtherAddr',
            name => 'src',
            bitRange => width(48),
        },
        {   type => 'u_int16',
            name => 'type',
            bitRange => width(16),
        },
        {   type => 'u_int16' ,
            name => 'payloadLen',
            bitRange => [$currentBit+1,$currentBit+16],
        },
    ], repSize => $repSize,
    reps => $reps,
};
```

```
/**
 * THIS FILE IS AUTOGENERATED
 */ ifndef PKTHDR_IPV6HEADER_H
define PKTHDR_IPV6HEADER_H include <gs/Types.h>
include <hal/Types.h>
include <string.h> include <ip/Types.h>
include <ip/IpAddr.h>
#include <pkthdr/PktHdrTypes.h>

~505
class Ipv6Header {
  public:
    Ipv6Header();
    Ipv6Header( AdtConstructorHint );

...                         515
    void src( Ipv6Addr );
    Ipv6Addr src( ) const;
                                510
    void dst( Ipv6Addr );
    Ipv6Addr dst( ) const;

...

private:
    u_int64 rep_[ 5 ];
};
                                520
```

```
                                                                500

INLINE Ipv6Addr
Ipv6Header::src( ) const {                                      530
    Ipv6Addr result;
    result.rep32( 0, u_int32( ( rep_[1] & 0xffffffff00000000ULL ) >> 32 ));
    result.rep32( 1, u_int32( ( rep_[1] & 0x00000000ffffffffULL ) ));
    result.rep32( 2, u_int32( ( rep_[2] & 0xffffffff00000000ULL ) >> 32 ));
    result.rep32( 3, u_int32( ( rep_[2] & 0x00000000ffffffffULL ) ));
    return result;
}
INLINE void
Ipv6Header::src( Ipv6Addr v ) {
    u_int64 val;

val = v.rep32( 0 );
    rep_[1] &= ~0xffffffff00000000ULL;
    rep_[1] |= ((u_int64) val << 32 ) & 0xffffffff00000000ULL;   555 val = v.rep32( 1 );
    rep_[1] &= ~0x00000000ffffffffULL;
    rep_[1] |= ((u_int64) val      ) & 0x00000000ffffffffULL;

val = v.rep32( 2 );
    rep_[2] &= ~0xffffffff00000000ULL;
    rep_[2] |= ((u_int64) val << 32 ) & 0xffffffff00000000ULL;

val = v.rep32( 3 );
    rep_[2] &= ~0x00000000ffffffffULL;
    rep_[2] |= ((u_int64) val      ) & 0x00000000ffffffffULL; }

INLINE Ipv6Addr
Ipv6Header::dst( ) const {
    Ipv6Addr result;
    result.rep32( 0, u_int32( ( rep_[3] & 0xffffffff00000000ULL ) >> 32 ));
    result.rep32( 1, u_int32( ( rep_[3] & 0x00000000ffffffffULL ) ));
    result.rep32( 2, u_int32( ( rep_[4] & 0xffffffff00000000ULL ) >> 32 ));
    result.rep32( 3, u_int32( ( rep_[4] & 0x00000000ffffffffULL ) ));
    return result;
}
INLINE void
Ipv6Header::dst( Ipv6Addr v ) {
    u_int64 val;
    val = v.rep32( 0 );
    rep_[3] &= ~0xffffffff00000000ULL;
    rep_[3] |= ((u_int64) val << 32 ) & 0xffffffff00000000ULL;
    val = v.rep32( 1 );                                          525
    rep_[3] &= ~0x00000000ffffffffULL;
    rep_[3] |= ((u_int64) val      ) & 0x00000000ffffffffULL;
    val = v.rep32( 2 );
    rep_[4] &= ~0xffffffff00000000ULL;
    rep_[4] |= ((u_int64) val << 32 ) & 0xffffffff00000000ULL;
    val = v.rep32( 3 );
    rep_[4] &= ~0x00000000ffffffffULL;
    rep_[4] |= ((u_int64) val      ) & 0x00000000ffffffffULL; } endif // inline defns
endif
```

FIG. 5

```
extern "C" {
#include <perl/EXTERN.h>
#include <perl/perl.h>
#include <perl/XSUB.h> }
#include <gs/perlif/PlGs.h>
#include <pkthdr/Ipv6Header.h>
MODULE = Ipv6Header          PACKAGE = Ipv6Header
PROTOTYPES: DISABLE
Ipv6Header *
new( name )
   char * name
CODE:
   RETVAL = new Ipv6Header;
OUTPUT:
   RETVAL
 MODULE = Ipv6Header          PACKAGE = Ipv6HeaderPtr
Ipv6Header *
new( original )
   SV * original
CODE:
    RETVAL = new Ipv6Header;
    *RETVAL = *(Ipv6Header *) SvIV((SV*) SvRV( original ));
OUTPUT:
   RETVAL
void
Ipv6Header::DESTROY()

u_int8
Ipv6Header::version( ATTRIBUTE )

u_int8
Ipv6Header::tclass4Bit( ATTRIBUTE )

u_int
Ipv6Header::tclass( ATTRIBUTE )

u_int
Ipv6Header::flowId( ATTRIBUTE )

u_int16
Ipv6Header::payloadLen( ATTRIBUTE )

IpProtocol
Ipv6Header::nextHeader( ATTRIBUTE )

u_int8
Ipv6Header::hopLimit( ATTRIBUTE )

Ipv6Addr
Ipv6Header::src( ATTRIBUTE )

Ipv6Addr
Ipv6Header::dst( ATTRIBUTE )

u_int64
Ipv6Header::rep( i, ATTRIBUTE )
   int i
```

```
use PktHdrLib;
sub name { 'test_ipv6traffic' } sub pkt_ {
    my $me = shift;
    my ($port, $pktData, $id) = @_;
    my $pkt = $me->SUPER::pkt_(@_);

$pkt->etherType(0x86dd);
    my $addr = Ipv6Addr->new;
    $addr->zero(1); # otherwise Ipv6Addr->new fills with
random data.
    $addr->rep32(0, $id+0xdead);
```
705
```
    my $ipv6Hdr = Ipv6Header->new;
    $ipv6Hdr->version(0x6);
    $ipv6Hdr->tclass(0x03);
    $ipv6Hdr->flowId(0);
```
710  `$ipv6Hdr->payloadLen($pkt->bodySize-$ipv6Hdr->size);`
```
    $ipv6Hdr->nextHeader('IpProtocolV6NoHdr'); # 0x3b
    $ipv6Hdr->hopLimit(0xff);
```
715  $ipv6Hdr->dst($addr);
```
    $addr->rep32(0, $id+0xbeef);
```
$ipv6Hdr->src($addr);
```
    my $crc=pack("C*",0..3);
    print "device_test_ipv6traffic: pkt_
".$ipv6Hdr->dst->str()."\n";

$pkt->body($ipv6Hdr->data().substr($pktData,$ipv6Hdr->size+14));
    $pkt->crc($pkt->computedCrc);
    print " pkt_ $id: ". $pkt->str()."\n";
    $pkt
}
```

FIG. 7

AUTO CODE GENERATION TO GENERATE PACKET HEADER GENERATION LIBRARY FOR SWITCH DIAGNOSTICS

BACKGROUND

1. Technical Field

Embodiments described in this disclosure generally relate to development tools, and more particularly to using auto code generation to generate packet header generation libraries for switch diagnostics.

2. Description of the Related Art

Switching and routing devices often provide the ability to run a variety of self-diagnostic and validation tests. For example, during a power on self-test (POST), a switch may generate and send a variety of packets to ports on a device to ensure such ports are functioning properly. Similarly, switching and routing devices may allow users to compose relatively simple testing scripts to test and diagnose the functioning of these devices. Such testing and validation processes frequently require the switching or routing device to generate a broad variety of network packet/frame headers. Accordingly, the firmware running on these devices typically includes modules to internally generate the packet headers needed by these testing/validation routines. Behind these modules, developers have to write code to generate headers as needed by the testing/validation routines. As new protocols (both proprietary and standardized) are developed, new header libraries have to be created and added to the firmware on the switch.

While some packet generation tools are available, they typically have a number of dependencies on other packages or libraries, as well as dependencies on specific development environments (e.g., a particular compiler version or system architecture). Thus, using these tools to generate packets in switch firmware requires developers to port any necessary source code and header files into a format appropriate for the firmware. However, the amount of space allocated in the firmware for diagnostic routines can be relatively limited. This frequently precludes developers from using full-fledged packet-generation libraries due to firmware size limitations, as these libraries do not allow them to describe packet headers using the library without fully integrating the library, which may include a variety of unneeded elements (e.g., function to transmit/inspect packets). Thus, even where developers are willing to port the necessary code or header files, doing so may result in a packet generation facility that exceeds the space limitations of switch firmware. Further, the interfaces for such library may be available only in a procedural language (e.g., the C programming language), making it difficult to invoke the functions provided by these interfaces from commonly used scripting languages, (e.g., Perl scripts). Further still, currently available packet generation tools may simply be incapable of generating certain packet header types, e.g., packet header types defined by standards developed following the version of the library or proprietary packet header definitions used by proprietary protocols.

Accordingly, porting the available packet-generation libraries just to obtain the packet header generation needed by the diagnostic/testing portions of firmware is both time consuming and can result in a bloated firmware footprint. Because of this, in many cases, it becomes easier for developers to write packet header generation libraries on a "one-off" basis.

SUMMARY

Embodiments described in this disclosure generally provide auto code generation tools used to generate packet header generation libraries used for switch diagnostics.

One embodiment of the disclosure includes a system having a processor and a memory containing a code generation program, which when executed on the processor is configured to perform an operation for generating source code for representing a packet header in firmware on a switching device. The operation may generally include receiving a description of the packet header in a description format. The description format includes a definition for each of a plurality of header fields present in the packet header. The operation may further include generating, from the description of the packet header, a header library for inclusion in the firmware of the switching device. The header library may be compiled and installed as part of the firmware of the switching device.

In a particular embodiment, the definition for each of the plurality of header fields includes a field name, a field type, and a field size. And the packet header library may define a plurality of invokable functions for an object class representing the packet header. Typically, the functions provide accessor member functions for an object of the packet header type, including include at least a function to get an attribute value and a function to set the attribute value for each of the plurality of header fields.

The code generation program may be further configured to generate, from the description of the packet header library, a binding between the packet header library and a scripting language. And to receive a script which invokes one or more of a member functions for an object class representing the packet header through the bindings. In such a case, the script may perform a diagnostic routine configured to validate operational performance of the switching device. The script may invoke the functions in order to generate packet headers using the header library.

Another embodiment of the disclosure includes a computer-implemented method for generating source code for representing a packet header in a firmware on a switching device. The method may generally include receiving a description of the packet header in a description format. The description format may include a definition for each of a plurality of header fields present in the packet header. The method may also include generating, from the description of the packet header, a header library for inclusion in the firmware of a switching device, compiling the header library as part of the firmware of the switching device, and installing the firmware on the switching device.

Still another embodiment of the disclosure includes a computer-readable storage medium containing a program, which when executed on a processor is configured to perform an operation for generating source code for representing a packet header in a firmware on a switching device. The operation may generally include receiving a description of the packet header in a description format. The description format may include a definition for each of a plurality of header fields present in the packet header. The operation may further include generating, from the description of the packet header, a header library for inclusion in the firmware of a switching device, compiling the header library as part of the firmware of the switching device, and installing the firmware on the switching device.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIGS. 4-7 illustrate an example of source code for an implementation of a code generation tool for generating libraries for switch diagnostics, according to one embodiment.

DETAILED DESCRIPTION

The present disclosure describes the use of an auto code generation tool to generate packet header generation libraries needed for switch diagnostics. For example, a technique is disclosed for describing packet headers in a format that can be used by the code generation tool to generate source code that can generate any type of packet header when compiled and invoked within switch/router firmware. Such packet headers may then be used in a variety of switch diagnostic/testing functions. Thus, it becomes unnecessary for developers to write the individual code modules for generating packet headers or to port code from other libraries or operating systems. Instead, a developer need only describe headers for a new protocol in the packet header code generation format.

One embodiment disclosed herein provides a code generation tool configured to receive a description of a packet header in the description format. The packet description language provides an easily used approach for defining fields in a packet header. Further, the code generation tool may be configured to generate a packet header library for use by firmware on a network device, e.g., for testing and diagnostic functions. Additionally, the application programs disclosed herein may be distributed on a variety of computer-readable storage media. Illustrative computer-readable storage media includes, but is not limited to: (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. For example, as described in greater detail herein, one embodiment includes a computer-readable storage medium containing a program, which when executed on a processor is configured to perform an operation for generating source code for representing a packet header within firmware on a switching device.

Other media include communications media through which information is conveyed to a computer, such as through a computer or telephone network, including wireless communications networks. The latter embodiment specifically includes transmitting information to/from the Internet and other networks.

Figure 1:
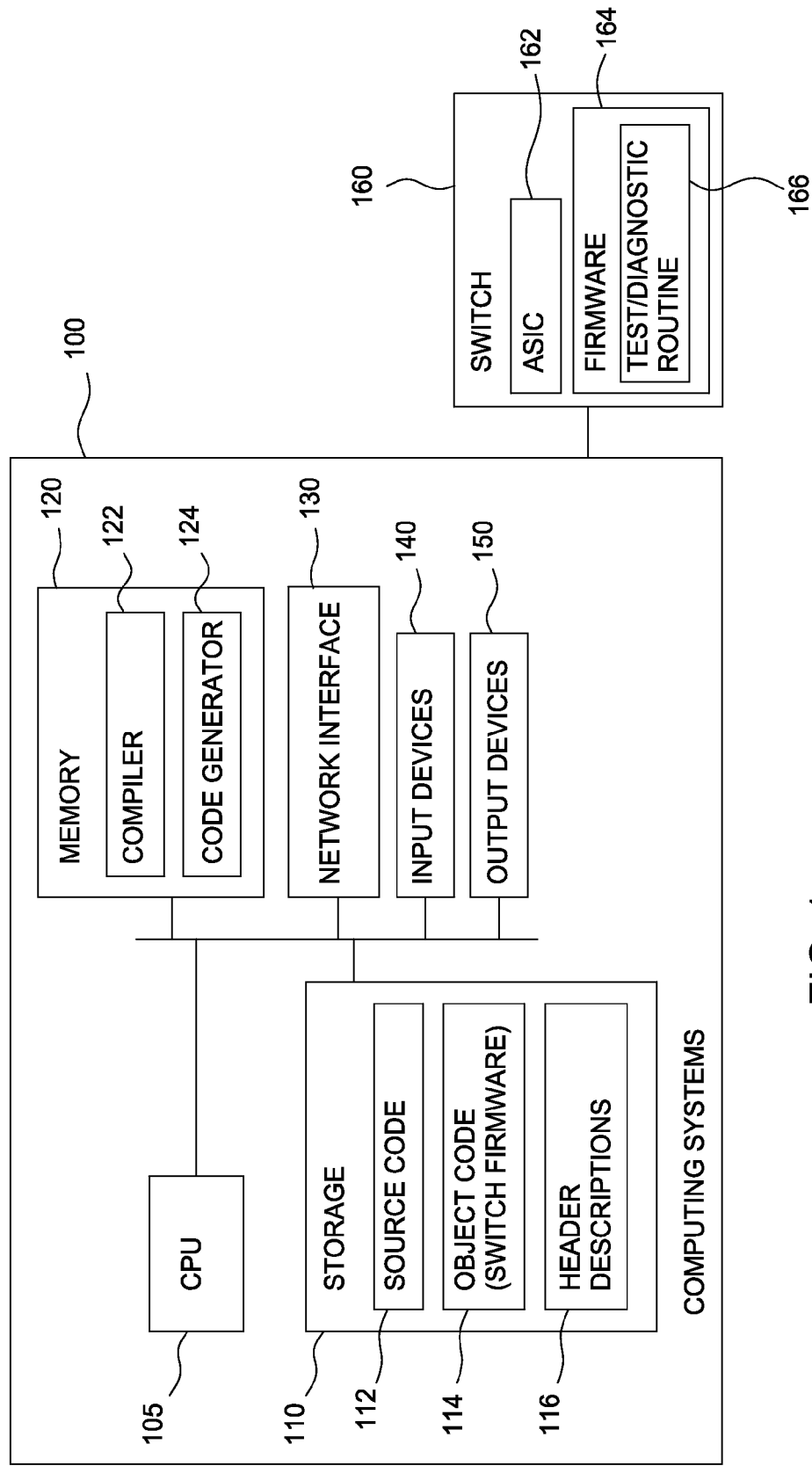
FIG. 1 illustrates an example computing system configured to generate packet header generation libraries for switch diagnostics, according to one embodiment.

FIG. 1 illustrates an example of a computing system 100 configured to generate packet header generation libraries for switch diagnostics, according to one embodiment. System 100 is included to be generally representative of a computing system having a processor, a memory, and storage devices (e.g., magnetic disk drives), etc. Alternatively, computing system 100 may be a server accessed using a remote desktop facility over a network. As shown, the computing system 100 includes a central processing unit (CPU) 105 connected to storage 110, memory 120, a network interface 130, and input/output devices 140, 150. CPU 105 is included to be representative of a single CPU, multiple CPUs, a single CPU having multiple processing cores, and the like. Storage 110 stores application programs and data for use by the computer system 100. The computing system 100 may be connected to a data communications network over network interface 130 (e.g., a local area network, which itself may be connected to other networks such as the internet). Of course, computing system 100 may also be other computing platforms having a processor, memory, and storage for applications and data, e.g., a PDA, netbook PC, and the like.

The input device 140 may be any device for providing input to the computing system 100. For example, a keyboard, keypad, light pen, touch-screen, track-ball, or speech recognition unit, audio/video player, and the like may be used. The output device 150 may be any device for providing output to a user of the computing system 100. For example, the output device 150 may be any conventional display screen or set of speakers, along with their respective interface cards, i.e., video cards and sound cards. Although shown separately from the input device 140, the output device 140 and input device 150 may be combined. For example, a display screen with an integrated touch-screen, a display with an integrated keyboard, or a speech recognition unit combined with a text-to-speech converter may be used.

The computing system 100 is also shown as being connected to a switch 160. The switch 160 is included to be representative of a variety of network devices configured to communicate or route network traffic from/towards a source and destination, e.g., a router, bridge, switch, and the like. As shown, switch 160 includes an application specific integrated circuit 162 and a firmware 164. Additionally, the firmware 166 includes a set of testing/diagnostic routines 166. As described herein, the diagnostic routines may be configured to invoke member functions provided by a packet header library generated by the compiler 122 and code generator 124.

Storage 110 is included to representative of a variety of hard disk drives, SSD memory devices, network storage (e.g., a SAN), etc. Illustratively, storage 110 includes source code files 112, object code files 114, and packet header descriptions 116, and memory 120 includes a compiler 122 and a code generator 124. The source code 112 generally represents a collection of source code files generated by the code generator 124 from the packet header descriptions 116.

In one embodiment, the packet header descriptions 116 specify what fields are defined for a header for particular network protocol. For example, in one embodiment, a developer may specify each field using a name, a type, and a size for each field allowed in the packet header. From this information, the code generator 124 may be configured to generate the source code for an object corresponding to the packet header. For example, in one embodiment, the code generator 124 may be configured to generate source code for a C++ object corresponding to the packet header described using the packet header descriptions 116. Such an object may include attributes corresponding to each element of the packet header as well as member accessor functions to set or return the value for each attribute.

The compiler 122 may provide a software tool configured to transform the source code 112 into the object code 114. In one embodiment, the object code 114 output by the compiler may provide a firmware object for the switch 160. Further, the code generator 124 may also generate bindings for the object, allowing a developer to instantiate the objects as well as invoke object member functions using a scripting language. For example, the code generator 124 may generate XSUB bindings for accessing the C++ objects from within Perl scripts. In turn, the Perl scripts may be composed to perform the actual run-time switch diagnostics, for example, as part of diagnostics performed when the switch 160 is powered-up. That is, the developer may use the generated source code 112 and object code 114 to compose diagnostic, testing, or validation routines 166 to include in switch firmware 164. Further still because the generated code does not include significant dependencies (e.g., dependencies on general operating system libraries), the resulting footprint in the compiled code (i.e., object code 114) remains relatively small—allowing it to readily be incorporated into switch firmware 164 (e.g., as test/diagnostic routines 166). Of course, one of ordinary skill in the art will recognize that while described herein using the well-known C++ and Perl languages, embodiments may be adapted for use with a variety of object-oriented programming languages, markup languages, and/or scripting languages.

Figure 2:
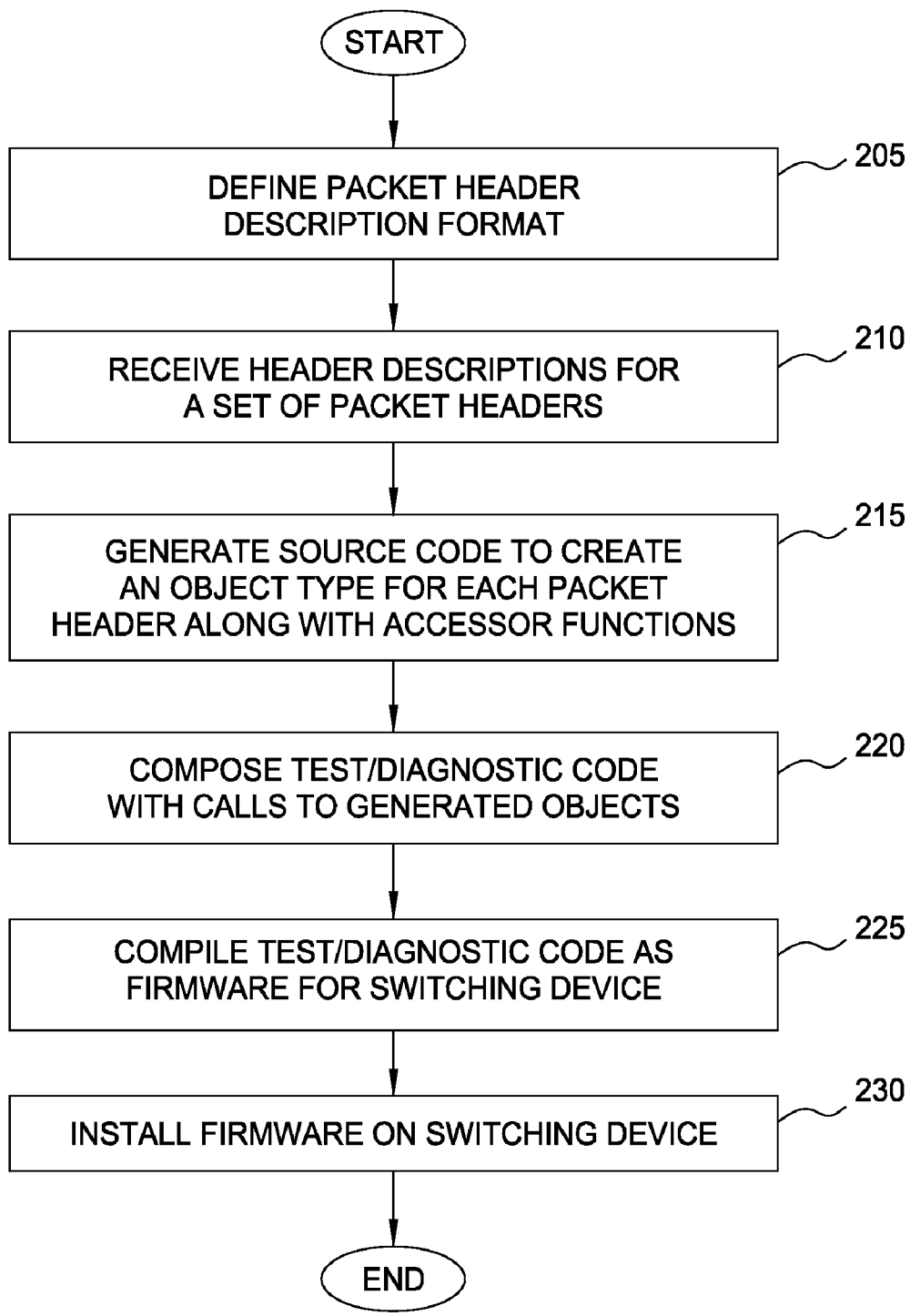
FIG. 2 is a flow chart illustrating a method for generating packet header generation libraries for switch diagnostics, according to one embodiment.

FIG. 2 is a flow chart illustrating a method 200 for generating packet header generation libraries for switch diagnostics, according to one embodiment. As shown, the method 200 begins at step 205 where a developer defines a packet header according to a packet description language format. The packet description language may allow the user to define a packet header format by specifying a plurality of fields present in the packet. The fields may be in a defined sequence, and each field may have a specified name, type, and size.

At step 210, the developer may supply the packet header definition to the code generator 124. Once received, the code generator 124 may parse the packet header definitions to identify each field defined for that particular packet header. At step 215, the code generator may generate source code corresponding to the packet header descriptions. For example, the code generator may create a source code file defining an object-oriented class (e.g., using the C++ programming language). The generated object may include a data attribute for each field in the packet header and member functions used to set/get each attribute (i.e., a set of accessor functions). Additionally, the code generator may create bindings to the object used within a scripting language (e.g., Perl XSUBs used to access an instance of the C++ object from within a Perl script).

At step 220, the developer may compose test/diagnostic routines to include on the firmware of a switching device. For example, as noted above, the generated code may include bindings for a scripting language. In such a case, the developer may compose diagnostic and/or testing scripts, which may be complied and included in the switching firmware. Accordingly, at step 225, the developer may compile the testing and diagnostic code as firmware for a switching device. And at step 230, the compiled firmware may be installed on a firmware device.

Figure 3:
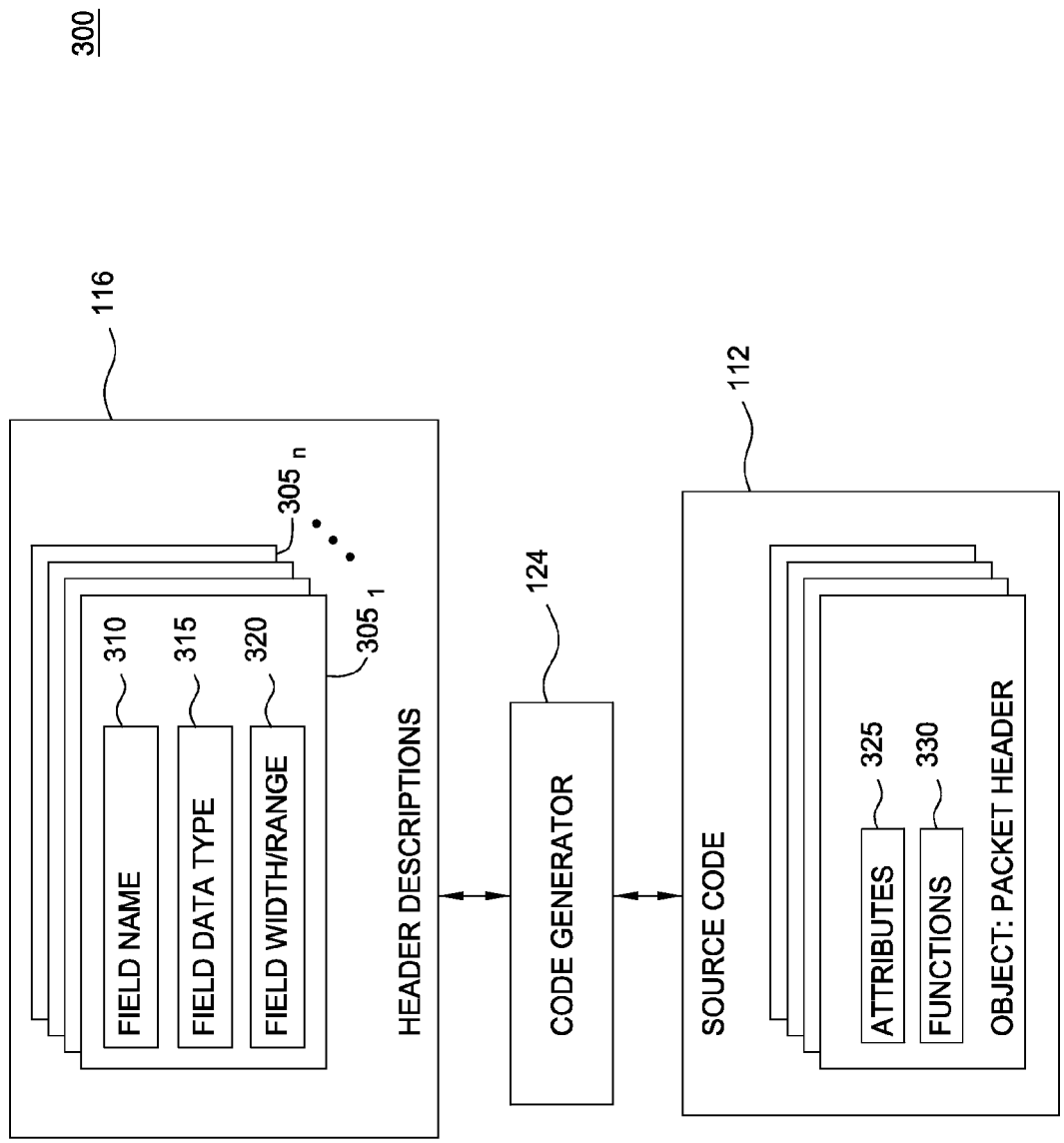
FIG. 3 illustrates an example of data structures used for generating packet header generation libraries for switch diagnostic and testing, according to one embodiment.

FIG. 3 illustrates an example of data structures used for generating packet header generation libraries for switch diagnostic and testing, according to one embodiment. As shown, the data flow includes a header description 116. Illustratively, the header description 116 includes a plurality of packet fields (referenced 305$_{1-N}$). Each field 305 includes a field name 310, a field data type 315, and a field width/range 320 for a particular network protocol. The protocol may represent a known standard (e.g., the fields of an Ethernet data frame or IPv4 or IPv6 header), but may also be a proprietary protocol used by a particular switching device. In this example, the header description 116 is supplied to the code generator 114. As noted above, the code generator 124 may generally be configured to generate source code files for an object corresponding to the packet headers defined by the packet description language. Accordingly, FIG. 3 shows source code 112, which includes a packet header object 312 generated by the code generator 124. Each one representing a packet header defined using the header description 116. Illustratively, the packet header object 312 includes attributes 325 and functions 330. In one embodiment, each attribute 325 corresponds to one of the fields in the header descriptions 116. Additionally, functions 330 correspond to accessor functions used to read or set the values for the fields in the packet header object.

FIGS. 4-7 illustrate an example of source code for an implementation of a code generation tool for generating libraries for switch diagnostics, according to one embodiment. In this example FIG. 4 shows, the contents of a header file 400 described using an example packet header description language modeled on the syntax of Perl. As shown, a type declaration at 405 defines a variable "$type{EtherHeader}", representing a header for an Ethernet frame. The fields defined for this example header includes a destination address (dst) at 410 and a source address (src) at 415. These fields each include a type—identifying the field as being a field an EtherAddr, i.e., an Ethernet address, a name, and a size. In this case, specified using a width function. As shown, the packet header description for an Ethernet header also includes a 16-bit field for an integer. However, the field named 'payloadlen' may share this space in an Ethernet frame with the 'u_int16' field. Accordingly, the packet description language allows certain fields to share the same bitrange within a packet header. In this example, the field positions within a header are managed by specifying a current bit—along with an offset for each frame being added to the field. The "width" function adjusts the currentBit variable with each additional field.

FIG. 5 illustrates an example source code file 500, which includes source code for a C++ object generated from a packet header description for an IPv6 header. In this example, the source code file 500 represents code generated by the code generator 124 for a source address field and a destination address field of an IPv6 header. As shown, a class declaration at 505 specifies "Ipv6Header" and signatures for member functions used to access source (src) addresses at 515 and destination (dst) addresses at 510. As shown, a function with a signature of "void src (Ipv6Addr);" may be used to set a source address field for an IPv6 header and a function with a signature of "Ipv6Addr src( ) const;" may be used to retrieve the current value of a source address for an IPv6 header. The function definitions for the source address functions (src) are shown at 530 (for the "getting" accessor function) and at 555 (for the "setting" accessor function). Similarly, the function definitions for the destination address functions (dst) are shown at 520 (for the "getting" accessor function) and at 525 (for the "setting" accessor function). Of course one of ordinary skill in the art will recognize that the packet header defined by the packet header description language may be implemented in a variety of ways, and that the C++ source code shown in FIG. 5 represents just one possible implementation.

FIG. 6 illustrates another example source code file 600 which may be generated by the code generator 124, according to one embodiment. Specifically, source code file 600 shows example source code for a Perl XSUB, which provides a binding for the C++ class "Ipv6Header" of FIG. 5. Illustratively, XSUB in source code file 600 the includes a definition for both of the source functions (src) at 605 and destination functions (dst) at 610, as well as function prototypes for other fields of an IPv6 header. Of course, like the source code of FIG. 5, the actual implementation generated by the code generator 124 may vary, and further, the code generator 124 may be adapted to provide bindings for a variety of scripting languages other than Perl.

As noted above, the source code generated by code generator 124 may be compiled and linked with firmware for a switching device. And further, that once included in the switching firmware, developers may compose testing and diagnostic routines to ensure that a given switching device correctly processes packet headers of different types. For example, FIG. 7 illustrates a Perl script 700 configured to generate and use an IPv6 header from the source code generated, compiled, and linked from the description of an IPv6 header. That is, from a packet header described according to the packet header description language (e.g., the packet description language shown in FIG. 4) and supplied to the code generator.

As shown in FIG. 7, the Perl subroutine named "pkt_" creates an IP6packet using the XSUB bindings (from FIG. 6) and the "IPv6Header" class shown in FIG. 6. In this example, the "pkt_" subroutine declares a new IPv6 header variable ($ipv6Hdr) and invokes the constructor "Ipv6Header->new;" for this variable. The Perl script then sets a number of fields of an Ipv6 header represented by the $ipv6Hdr object. For example, at 710 the Perl script sets the destination address (dst) of the $ipv6Hdr object with the line "$ipv6Hdr->dst ($addr)," setting the destination address to the value of the $addr variable. The next line of the Perl script modifies the value of the $addr variable. And the next line then sets the source address (src) of the $ipv6Hdr object with the line "$ipv6Hdr->src($addr);". Once all the fields of the $ipv6Hdr are set, the Perl script then performs a crc check on the packet and outputs the results of a diagnostic check. Of course, one of ordinary skill in the art will recognize that the example Perl script 700 is simplified to highlight the user of the code generated by the generator 124, and that the actual diagnostic or testing functions performed by such a routine may be tailed to suit the needs of an individual case.

Advantageously, as neither the IPv6 header object and script bindings generated by the code generator nor the diagnostic routines that invoke the functions in the generated source code include significant dependencies (e.g., dependencies on general operating system libraries), the resulting footprint in the compiled code remains relatively small—allowing it to readily be incorporated into switch firmware. Further, because the packet header description language (an example of which is shown in FIG. 5) allows developers to define a variety of different packet headers—simply by defining a name, type, and size of each field in a particular header—developers can use the packet description language to rapidly define additional packet header types, whether representing either standard or proprietary protocols.

Once defined using the packet header description format, the code generation tool may generate source code that can generate any type of packet header when compiled and invoked within switch/router firmware. Such packet headers may then be used in a variety of switch diagnostic/testing functions. Thus, it becomes unnecessary for developers to write the individual code modules for generating packet headers or porting code from other libraries or operating systems. Instead, a developer need only describe headers for a new protocol in the packet header code generation format.

While the foregoing is directed to embodiments of the present disclosure, other and further embodiments of the disclosure may be devised without departing from the basic scope thereof, and the scope thereof is determined by the claims that follow.

The invention claimed is:

1. A system, comprising:
a processor; and
a memory containing a code generation program, which when executed on the processor is configured to perform an operation for generating source code for representing network packet headers conforming to a given networking protocol in firmware on a switching device, the operation comprising:
receiving a description of the network packet headers in a description format, wherein the description format includes a definition for each of a plurality of network packet header fields defined by the given networking protocol,
generating, from the description of the network packet headers, a network packet header library, and
compiling the header library as part of the firmware of the switching device.

2. The system of claim 1, wherein the definition for each of the plurality of network packet header fields includes a field name, a field type, and a field size.

3. The system of claim 1, wherein the network packet header library defines a plurality of invokable functions for an object class representing the network packet headers composed according to the networking protocol.

4. The system of claim 3, wherein the plurality of functions include at least a function to get an attribute value and a function to set the attribute value for each of the plurality of network packet header fields.

5. The system of claim 1, wherein the operation further comprises, generating, from the description of the network packet headers, a binding between the network packet header library and a scripting language.

6. The system of claim 5, wherein the operation further comprises, receiving a script configured to invoke one or more of a plurality of invokable functions for an object class representing the network packet header.

7. The system of claim 6, wherein the script invokes at least one of the functions in the network packet header library in order to generate at least a first network packet header configured according to the given networking protocol described in the description format.

8. A computer-implemented method for generating source code for representing network packet headers using a given networking protocol in a firmware on a switching device, the method comprising:
receiving a description of the network packet headers in a description format, wherein the description format includes a definition for each of a plurality of network packet header fields defined by the given networking protocol,
generating, from the description of the network packet headers, a network packet header library for inclusion in the firmware of the switching device, and
compiling the header library as part of the firmware of the switching device.

9. The computer-implemented method of claim 8, wherein the definition for each of the plurality of network packet header fields includes a field name, a field type, and a field size.

10. The computer-implemented method of claim 8, wherein the network packet header library defines a plurality of invokable functions for an object class representing the network packet headers composed according to the networking protocol.

11. The computer-implemented method of claim 10, wherein the plurality of functions include at least a function to get an attribute value and a function to set the attribute value for each of the plurality of network packet header fields.

12. The computer-implemented method of claim 8, further comprising, generating, from the description of the network packet headers, a binding between the network packet header library and a scripting language.

13. The computer-implemented method of claim 12, further comprising, receiving a script configured to invoke one or more of a plurality of invokable functions for an object class representing the network packet header.

14. The computer-implemented method of claim 13, wherein the script invokes at least one of the functions in the network packet header library in order to generate at least a first network packet header configured according to the given networking protocol described in the description format.

15. A non-transitory computer-readable storage medium containing a program, which when executed on a processor is configured to perform an operation for generating source code for representing network packet headers using a given networking protocol in a firmware on a switching device, the operation comprising:
receiving a description of the network packet headers in a description format, wherein the description format includes a definition for each of a plurality of network packet header fields defined by the given networking protocol;
generating, from the description of the network packet headers, a network packet header library for inclusion in the firmware of the switching device; and
compiling the header library as part of the firmware of the switching device.

16. The computer-readable storage medium of claim 15, wherein the definition for each of the plurality of network packet header fields includes a field name, a field type, and a field size.

17. The computer-readable storage medium of claim 15, wherein the network packet header library defines a plurality of invokable functions for an object class representing the network packet headers composed according to the networking protocol, including at least a function to get an attribute value and a function to set the attribute value for each of the plurality of network packet header fields.

18. The computer-readable storage medium of claim 15, wherein the operation further comprises, generating, from the description of the network packet headers, a binding between the network packet header library and a scripting language.

19. The computer-readable storage medium of claim 18, wherein the operation further comprises, receiving a script configured to invoke one or more of a plurality of invokable functions for an object class representing the network packet header.

20. The computer-readable storage medium of claim 19, wherein the script invokes at least one of the functions in the network packet header library in order to generate at least a first network packet header configured according to the given networking protocol described in the description format.

* * * * *

UNITED STATES PATENT AND TRADEMARK OFFICE
CERTIFICATE OF CORRECTION

| | | |
|---|---|---|
| PATENT NO. | : 8,065,656 B2 | Page 1 of 1 |
| APPLICATION NO. | : 12/474907 | |
| DATED | : November 22, 2011 | |
| INVENTOR(S) | : Ong et al. | |

It is certified that error appears in the above-identified patent and that said Letters Patent is hereby corrected as shown below:

Column 2, Line 20, please delete "include".

Signed and Sealed this
Thirteenth Day of March, 2012

David J. Kappos
*Director of the United States Patent and Trademark Office*